V. A. FYNN.
ALTERNATING CURRENT MOTOR.
APPLICATION FILED FEB. 14, 1917.

1,254,221.

Patented Jan. 22, 1918.

2 SHEETS—SHEET 1.

INVENTOR
Valire A. Fynn
BY
E. E. Huffman
ATTORNEY

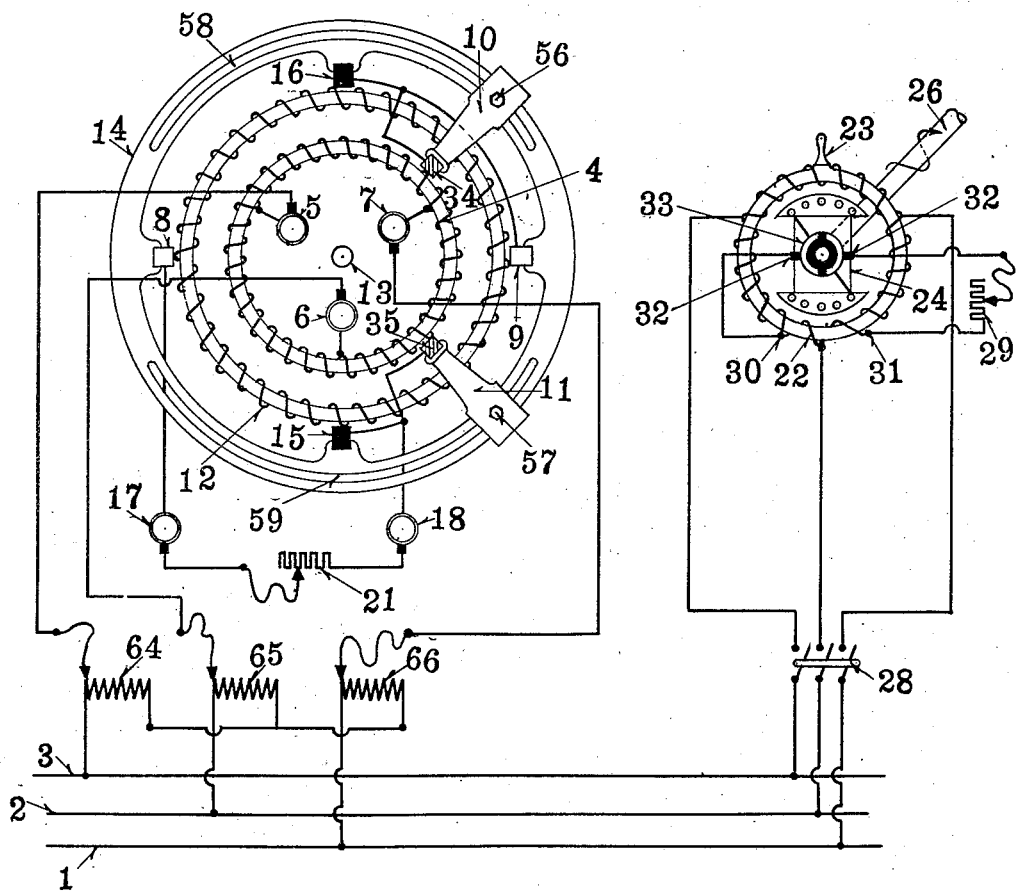

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,254,221.

Specification of Letters Patent. Patented Jan. 22, 1918.

Application filed February 14, 1917. Serial No. 148,513.

*To all whom it may concern:*

Be it known that I, VALÈRE A. FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to alternate current motors in which the primary is connected to the supply and the secondary is provided with a commuted winding with which coöperate brushes carrying a unidirectional load current and driven at synchronous speed with respect to the primary. In connection with machines of the type described, it has heretofore been proposed to regulate their speed by introducing into the unidirectional load circuit of the secondary a direct-current regulating E. M. F., deriving same from an auxiliary dynamo electric machine either entirely independent of the alternate current motor to be regulated, or mechanically coupled thereto.

The object of this invention is to eliminate this auxiliary dynamo electric machine and to so constitute the motor itself as to make it possible to derive from its primary the direct current E. M. F. necessary for the speed regulation of the machine. This same E. M. F. can also be made use of for the purpose of regulating the power factor of the motor.

Figure 1:
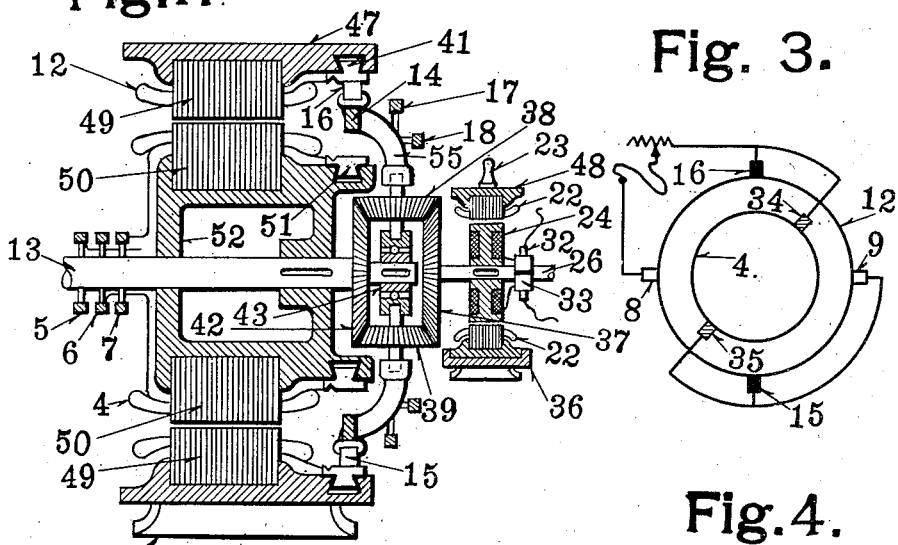

In the accompanying diagrammatic drawings, my invention is illustrated as applied to a two-pole three-phase motor the primary of which is adapted to revolve while the secondary is stationary. Figure 1 shows a longitudinal section through the complete apparatus. Fig. 2 illustrates the electrical connections. Figs. 3, 4, 5 and 6 are explanatory connection diagrams.

Referring to the figures, the shaft 13 of the motor carries the spider 52 keyed to it and supporting the laminations 50 in which is embedded the commuted winding 4 connected to a commutator 51 also carried by the spider 52. Three slip rings, 5, 6, 7, insulatingly supported by the shaft 13 are connected to equidistant points of the commuted winding 4. The stator comprises a frame 47 provided with feet 44 which supports the laminations 49 in which is embedded a commuted winding 12 connected to a commutator 41 also supported by the frame 47. Coaxially located with the main motor is an auxiliary three-phase self-excited synchronous motor the shaft 26 of which is lined up with the shaft 13 of the main motor and carries a field magnet provided with the exciting winding 24 connected to a two-part commutator 33 coöperating with stationary brushes 32. This revolving field magnet has defined polar projections and short circuited copper bars embedded therein. The stator of the auxiliary synchronous motor carries a winding 22 connected at three equidistant points to the mains 1, 2, 3 by means of the switch 28. The stator laminations in which the winding 22 is embedded, are carried in the frame 48 so resting on a support 36 that these laminations can be moved through a certain angle concentrically with the revolving field by means of the handle 23. The brushes 32 are connected to two points 30, 31 of the stator winding 22 through the regulating resistance 29.

There are two sets of brushes coöperating with the stator winding 12 of the main motor and its commutator 41. The brushes 15, 16 contacting with diametrically opposite points of the commutator, form one set; the brushes 8, 9, also contacting with diametrically opposite points of this commutator but displaced by 90 electrical degrees from the brushes 15, 16, form the other set. The former will be referred to as the working brushes, the latter as the exciting or compensating brushes. All of these brushes are insulatingly carried by the brush carrier 14 to which are also attached the brushes 34, 35 coöperating with the commutator 51 of the rotor commuted winding 4. The arms 10, 11, which insulatingly support the brushes 34, 35, to which I will refer as regulating brushes, are guided on the brush carrier 14 and attached thereto by means of the screws 56, 57 passing through the circular slots 58, 59 in said carrier 14. This arrangement permits of the position of the brushes 34, 35 to be varied with relation to the position of the brushes 15, 16. In Fig. 2, the brushes 9, 16 and 34 are directly interconnected. Brush 35 is directly connected to 15, but an adjustable resistance 21 is interposed between the brush 35 and the brush 8. The slip rings 17, 18, insulatingly carried by the brush carrier 14 and brushes coöperating with said slip rings, permit the introduction of this regulating resistance in this circuit.

The slip rings 5, 6, 7, connected to equidistant points of the primary winding 4 can, by means of coöperating brushes, be connected to the mains 1, 2, 3, by means of variable ratio transformers 64, 65, 66. The brush carrier 14 is centered on the shaft 13 by means of the ball bearing 43 and the shafts of the two pinions 38, 39. These pinions gear on one side with the wheel 42 keyed to the shaft 13 of the main motor, and on the other with the wheel 37 keyed to the shaft 26 of the auxiliary synchronous motor.

Figure 6:
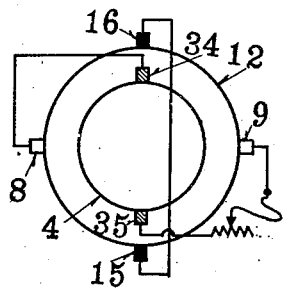

In explaining the operation of this motor, I will first assume that the connections between the brushes 8, 9, 15, 16, 34 and 35 are made as shown in Fig. 6, to which end the arm 10 must be moved in a counterclock direction after loosening the screw 56 until the brush 34 contacts with the commuted winding 4 along the vertical axis of Fig. 2, after which the screw 56 can again be tightened. Similarly, the arm 11 must be moved in a clockwise direction until the brush 35 contacts with the commuted winding 4 along the same axis. The brush 15 must then be disconnected from the brush 35, the brush 16 must be disconnected from the brush 34, and the brushes 15 and 16 must be directly interconnected or short-circuited. Having made these connections, I start the auxiliary synchronous motor by closing the switch 28. I then adjust the resistance 29 so as to cause the synchronous machine to operate with the desired power factor, say, for instance, with unity power factor. The connections between the winding 22 and the mains 1, 2, 3 are supposed to be so made as to cause the shaft 26 to revolve in a clockwise direction. The gear wheel 37 will therefore also revolve in this direction, and since the shaft 13 of the main motor is at rest, the pinions 38 and 39 will be so driven as to revolve the brush carrier 14 in a clockwise direction at a speed equal to that of the shaft 26. I now connect the primary 4 to a fraction of the line voltage by means of the variable ratio transformers 64, 65, 66. If this voltage is sufficiently great, the motor will start and reach a nearly synchronous speed. It will do this with particular ease if the brushes 8, 9 and 15, 16 are correctly positioned. How to so position these brushes will be explained later, but they ought to revolve in such a way as to always have the axis of the brushes 8, 9 coincide with the axis of the revolving field produced by the polyphase alternating currents in the winding 4. When this condition is fulfilled, then the working brushes 15, 16 will always be in an axis at right angles to that field. As soon as the primary 4 is connected to the mains and this revolving field is set up, a unidirectional current will flow in the conductors joining the brushes 15, 16, and the corresponding current in the stationary winding 12 will produce, in conjunction with the flux set up by the rotor, a torque which will cause the latter, when properly connected to the mains, to revolve in a counterclock direction. With the rotor connected to the mains and standing still, the nearly constant revolving flux produced by the polyphase currents sent into the rotor will revolve in a clockwise direction and at synchronous speed with respect to the stationary rotor and the stationary stator, and therefore in the same direction and at the same speed as the shaft 26 of the synchronous motor, and therefore as the brushes carried by the rocker 14. Because the brushes 34, 35 revolve at synchronous speed with respect to the stationary commuted winding 4 fed with alternating current, and in the same direction as the revolving flux produced by said current, a direct-current E. M. F. will appear at these brushes. Since these brushes are in an axis at right angles to the axis of the revolving field produced by 4, and coöperate with this two-pole winding at diametrically opposite points in Fig. 6, the direct-current E. M. F. appearing at these brushes will be a maximum. Since these brushes are connected to the compensating brushes 8, 9, coöperating with the stator winding 12, a unidirectional current will be sent into that winding along the axis of the brushes 8, 9, which coincides with the axis of the revolving field produced by the rotor. The connections are so made that this unidirectional stator excitation produces a flux of same direction as the alternating current rotor excitation. By adjusting the resistance 21, the magnitude of the magnetization produced by the direct current can be made equal to that produced by the alternating current, in which case all lagging alternating magnetizing currents will disappear from the rotor and the revolving field in the machine will be entirely due to the direct current derived from 4 by means of the brushes 34, 35 revolving synchronously with respect to 4 and sent into the stationary winding 12 by means of the synchronous revolving brushes 8, 9. Under these conditions, the motor will act as a rotary converter. As already explained, a load or torque current will circulate through the stator winding 12 by way of the brushes 15, 16, because the latter close said winding along an axis displaced by 90 electrical degrees with respect to the axis of the nearly constant revolving field in the machine, and therefore join points of maximum unidirectional potential in that winding. If the voltage impressed on the slip rings 5, 6, 7, is sufficient to start the motor under the prevailing conditions, then the rotor will move and, as is well known, its direction of rotation will be opposed to the direction of rotation of the revolving field produced by it. In this case, it will therefore move in a counterclockwise direction. This movement of the rotor will naturally decrease the relative speed between the revolving field produced by the rotor and the stationary member. If nothing else happened, then the speed of the brushes would now differ from the speed of the revolving flux produced by the rotor, and the operation of the machine would be interfered with. But, since the rotor of the main motor is geared to the brush carrier 14 in the manner shown in Fig. 1, a movement of the shaft 13 in a direction opposed to that of the shaft 26 will correspondingly reduce the speed of the brush carrier and will make that speed, and therefore the speed of the brushes 8, 9, 15, 16, with respect to the stator winding 12, exactly the same as the speed of the revolving flux produced by the rotor with respect to that same winding; in other words, the brushes 8, 9 will remain in the axis of the revolving flux produced by 4. This reduction in the speed of the brush carrier 14, will also reduce the speed of the brushes 34, 35 and will keep them revolving at synchronous speed with respect to the rotor winding 4. Whatever change the speed of the rotor may undergo, the fact that the auxiliary synchronous motor always revolves at a synchronous speed, and the fact that the brush carrier 14 is differentially driven from the shaft of the synchronous and from the shaft of the main motor, will insure that the speed between the winding 4 of the rotor and the brushes 34, 35 will always remain equal to the synchronous, and that the brushes 8, 9 will always revolve with respect to 12 at the same speed as the revolving flux set up by the rotor revolves with respect to that same winding. The voltage impressed on the slip rings can now be increased until the normal operating value is reached, when the rotor will revolve at a nearly synchronous speed in a counterclockwise direction, whereas the brush gear will revolve at slip speed in the opposite direction. By "slip speed" I mean a speed equal to the difference between the synchronous and the speed of the rotor of the main motor. Exactly the same conditions will obtain if the brushes 34, 35 are left in the position shown in Fig. 2, while the brushes 15 and 16 are disconnected from said brushes and directly connected together. The only difference will be that in order to secure the same degree of unidirectional magnetization, it will be necessary to reduce the regulating resistance 21, because the E. M. F. appearing at the brushes 34, 35, when not located at diametrically opposed points of the two-pole winding 4, will be less than the maximum. However the brushes 34 and 35 are located, the principle of the operation will be the same. The motor will act as a rotary converter and the unidirectional current derived from the brushes 34, 35 coöperating therewith will be utilized for compensating the machine, that is, for bringing its power factor under control.

Figure 3:
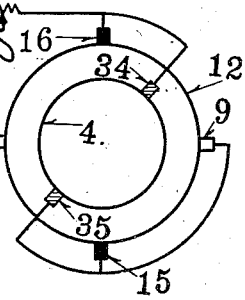

Suppose now that the connections shown in Fig. 2 are not altered. The foregoing explanation will make it clear that, when the machine is in operation, the brushes 34, 35 are not only in circuit with the compensating brushes 8, 9, but also with the load brushes 15, 16. In Fig. 2 the connections are such that the direct-current E. M. F. appearing at the brushes 34, 35, at any rotor speed, is opposed in direction to the direct-current E. M. F. appearing at the brushes 15, 16. Under these circumstances, the effective working E. M. F. in the load circuit of the main motor will be equal to the difference of these two E. M. F.'s and the speed at which the motor will run, will be correspondingly lower. When the brushes 15, 16 were directly short circuited, the speed of the machine was nearly equal to the synchronous. With the introduction of a regulating E. M. F. opposed in direction to that appearing at the brushes 15, 16, and in this case derived from the rotor 4 by means of the brushes 34, 35, the speed of the machine will be reduced below the synchronous. The greater the regulating E. M. F. derived from 4, the lower the speed of the motor; the smaller this E. M. F., the higher that speed  Now, the regulating E. M. F. derived from 4 can be regulated by moving the brushes 34, 35. These brushes can be moved so as to keep their axis constant, but so as to change the peripheral distance between them, in which case the maximum E. M. F. will be obtained in a two-pole machine when the distance between the brushes is equal to half the circumference of the commutator; in other words, when the brushes contact with the commutator at diametrically opposite points and when their axis of contact is at right angles to the axis of the revolving field of the motor. The E. M. F. derived from the motor for this method of moving the brushes will be a minimum when the distance between the brushes has been reduced to zero. But the brushes can also be so moved as to maintain their peripheral distance constant, but change their axis, for instance, as shown in Fig. 3. Under these conditions, the maximum E. M. F. derived from these brushes will be obtained when their axis is at right angles to the axis of the revolving field of the machine, while the minimum regulating E. M. F. will be had when their axis coincides with that of the revolving field of the machine. A combination of the two methods can, of course, be made.

Figure 5:
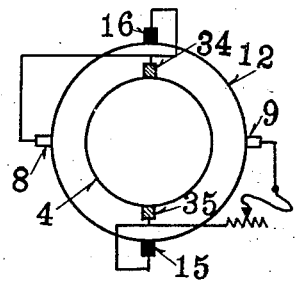
Figure 4:
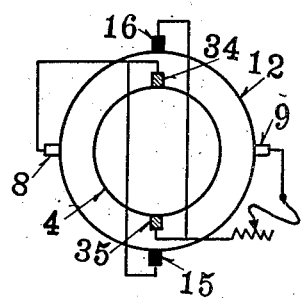

With the brushes connected as in Fig. 2, and with the regulating brushes 34, 35 positioned as shown in Fig. 5, the machine will run at its slowest speed. In order to increase the speed of the motor, it is necessary to displace the brushes either by moving their axis as shown in Fig. 3, or by diminishing the peripheral distance between them as shown in Fig. 2. When the regulating E. M. F. has been reduced to zero, then the speed of the machine will be nearly synchronous. This condition will be reached when the axis of the brushes 34, 35 in Fig. 3 coincides with the axis of the brushes 8, 9 in that figure, or when in Fig. 2 the brushes 34, 35 have been brought together at a point in line with the brushes 8, 9 of this figure. In order to secure a supersynchronous speed, it is necessary to continue to move the brushes in Fig. 3 beyond the axis of the brushes 8, 9, or to move them back in a counter-clockwise direction after having reversed the connection between said brushes and the working brushes. Similarly, the brushes in Fig. 2 can be moved back after changing connections between them and the working brushes 15, 16, or their motion can be continued in the original direction, when they will cross each other, in which case it will not be necessary to change connections. The maximum supersynchronous speed will, in any case, be reached when the brushes are positioned and connected as shown in Fig. 4.

The actual value of the maximum and minimum speed to be secured with a motor built in accordance with this invention, depends on the relative number of turns in the windings 4 and 12. If the number of effective turns in each of these windings is the same, then the speed corresponding to the conditions indicated in Fig. 5 will be zero, and that indicated in Fig. 4 will be equal to about twice the synchronous. If the number of effective turns in the winding 4 is equal to one half of the corresponding number in the winding 12, then the speed corresponding to conditions shown in Fig. 5 will be about one half the synchronous, while that corresponding to Fig. 4 will be about one and a half times the synchronous.

Whenever nothing but the direct current necessary for the compensation of the machine is taken from the rotor 4 by way of the brushes 34, 35, practically all the energy conveyed to the rotor 4 by way of the slip rings is transformed into mechanical work when the machine is running, a small part of it being converted for use in the unidirectional compensating circuit of the machine. When the regulating brushes 34, 35 are connected to the working brushes so as to reduce the speed of the motor below the synchronous, then the energy conveyed to the rotor 4 by way of the slip rings 5, 6, 7 is first transferred to the stator winding 12, a part of it being converted into mechanical energy while another part is conducted from the winding 12 by way of the brushes 15, 16 to the rotor winding 4 by way of the brushes 34, 35, and there converted from direct-current to alternating-current energy and sent back to the mains. When the connections between the working and regulating brushes are such as to raise the speed of the machine above the synchronous, then part of the energy conveyed to the rotor by way of the slip rings 5, 6, 7 is inductively transferred to the stator winding 12, and converted into mechanical energy, while another part is first converted into direct-current energy and then conducted by way of the brushes 34, 35 and 15, 16 into the stator winding 12 and there converted into mechanical energy.

In order to correctly place the compensating, the working, and the auxiliary brushes, one may proceed as follows; bring the brush gear up to speed by connecting the synchronous auxiliary motor to the mains, connect the rotor of the main motor to a fraction of the line voltage, interrupt the circuit of the working, the compensating, and the regulating brushes, connect a voltmeter across the working brushes, and move the stator of the auxiliary synchronous motor by means of the handle 23 until the voltmeter reading is a maximum. This will give the correct position of the working brushes. Now connect the voltmeter to the brushes 34, 35, and find for which position of the supporting arms 10 and 11 a maximum reading is obtained. For the arrangement of windings shown in Fig. 2, the corresponding position of the brushes will be coaxial with that of the working brushes. The correct position of the compensating brushes is always along an axis displaced by 90 electrical degrees from that of the working brushes.

While in the example shown the primary revolves and the secondary is stationary, the invention is also applicable to a motor in which the primary is stationary and the secondary revolves. All that is necessary is that the speed of the brush gear be at all times kept synchronous with respect to the primary member. In case this primary is stationary, then the only structural difference which becomes necessary is the elimination of the differential drive for the brush carrier 14. This brush carrier can then be mounted directly on the shaft of the synchronous motor. For the case of a stationary primary, the brush gear must always revolve at synchronous speed. It will also be understood that it is by no means necessary to have a single winding on the primary. The alternating current can be sent into one winding and the direct current can be collected from another winding, as is well understood in connection with rotary converters.

Having fully described my invention, what I claim as new and desire to secure by Letters Patent of the United States is:

1. In an alternating current motor, the combination of an inducing member provided with a polyphase winding, an induced member provided with a commuted winding, a set of working brushes coöperating therewith, means for revolving said brushes at such speed as to cause the relative speed of the brushes and the inducing member to equal the synchronous speed, and means in circuit with the brushes for deriving a direct current E. M. F. from the inducing member.

2. In an alternating current motor, the combination of an inducing member provided with a polyphase winding, an induced member provided with a commuted winding, a set of working brushes coöperating therewith, means for revolving said brushes at such speed as to cause the relative speed of the brushes and the inducing member to equal the synchronous speed, and brushes coöperating with the polyphase winding on the inducing member to derive a direct current E. M. F. therefrom, said brushes being in circuit with the working brushes.

3. In an alternating current motor, the combination of an inducing member provided with a polyphase winding, an induced member provided with a commuted winding, a set of working brushes coöperating therewith, means for maintaining the axis of said brushes in that axis of the commuted winding in which the induced potential is of maximum value, and brushes coöperating with the polyphase winding of the inducing member to derive a direct current E. M. F. therefrom, said brushes being in circuit with the working brushes.

4. In an alternating current motor, the combination of an inducing member provided with a commuted winding and a set of brushes coöperating therewith, an induced member provided with a commuted winding and a set of brushes coöperating therewith, means for revolving both sets of brushes, and means for changing the position of the brushes coöperating with the inducing member relative to the position of the brushes coöperating with the induced member.

5. In an alternating current motor, the combination of an inducing member provided with a polyphase winding, an induced member provided with a commuted winding, a set of working brushes coöperating therewith, means for revolving said brushes at such speed as to cause the relative speed of the brushes and the inducing member to equal the synchronous speed, brushes coöperating with the polyphase winding on the inducing member to derive a direct current E. M. F. therefrom, said brushes being in circuit with the working brushes, and means for varying the magnitude of said E. M. F.

6. In an alternating current motor, the combination of an inducing member provided with a polyphase winding, an induced member provided with a commuted winding, a set of working brushes coöperating therewith, means for revolving said brushes at such speed as to cause the relative speed of the brushes and the inducing member to equal the synchronous speed, brushes coöperating with the polyphase winding on the inducing member to derive a direct current E. M. F. therefrom, said brushes being in circuit with the working brushes, and means for changing the direction of said E. M. F. with relation to the working brushes.

7. In an alternating current motor, the combination of an inducing member provided with a polyphase winding, an induced member provided with a commuted winding, a set of working brushes coöperating therewith, means for revolving said brushes at such speed as to cause the relative speed of the brushes and the inducing member to equal the synchronous speed, and brushes coöperating with the polyphase winding on the inducing member to derive a direct current E. M. F. therefrom, said brushes being in circuit with the working brushes and coaxial therewith.

8. In an alternating current motor, the combination of an inducing member provided with a commuted winding, brushes coöperating therewith, an induced member provided with a commuted winding, two sets of brushes per pole pair coöperating with said winding, and means for revolving all of the brushes at such speed as to cause the relative speed of the brushes and the inducing member to equal the synchronous speed.

9. In an alternating current motor, the combination of an inducing member provided with a commuted winding, brushes coöperating therewith, an induced member provided with a commuted winding, two sets of brushes per pole pair coöperating with said winding, both sets of brushes being connected to the brushes coöperating with the inducing member, and means for revolving all of the brushes at such speed as to cause the relative speed of the brushes and the inducing member to equal the synchronous speed.

10. In an alternating current motor, the combination of an inducing member provided with a commuted winding, brushes coöperating therewith, an induced member provided with a commuted winding, two sets of brushes per pole pair coöperating with said winding, said sets of brushes being displaced by 90 electrical degrees from each other and both sets of brushes being connected to the brushes coöperating with the inducing member, and means for revolving all of the brushes at such speed as to cause the relative speed of the brushes and the inducing member to equal the synchronous speed.

11. In an alternating current motor, the combination of an inducing member provided with a commuted winding, brushes coöperating therewith, an induced member provided with a commuted winding, two sets of brushes per pole pair coöperating with said winding, and means for revolving all the brushes and maintaining one set of brushes on the induced member in that axis of said member in which the induced potential is at maximum value.

12. In an alternating current motor, the combination of an inducing member provided with a commuted winding and brushes coöperating therewith, an induced member provided with a commuted winding and two sets of brushes per pole pair coöperating therewith, and means for maintaining the axis of one set of brushes on the induced member in that axis of said member in which the induced potential is approximately zero, said brushes being in circuit with the brushes coöperating with the inducing member.

13. In an alternating current motor, the combination of an inducing member provided with a polyphase winding, brushes coöperating therewith, an induced member provided with a commuted winding and brushes coöperating therewith, said brushes being in circuit with the brushes coöperating with the polyphase winding on the inducing member, and means for causing the axis of the brushes coöperating with the induced member to coincide with the axis of each phase of the polyphase inducing winding when the voltage impressed on that phase is approximately zero.

In testimony whereof, I have hereunto set my hand and affixed my seal.

VALÈRE A. FYNN. [L. S.]